US005958624A

United States Patent [19]

Frech et al.

[11] Patent Number: 5,958,624

[45] Date of Patent: Sep. 28, 1999

[54] MESOSTRUCTURAL METAL OXIDE MATERIALS USEFUL AS AN INTERCALATION CATHODE OR ANODE

[75] Inventors: Roger E. Frech; Xulong Zhang, both of Norman, Okla.

[73] Assignee: Research Corporation Technologies, Inc., Tucson, Ariz.

[21] Appl. No.: 08/993,698

[22] Filed: Dec. 18, 1997

[51] Int. Cl.[6] .................... H01M 4/48

[52] U.S. Cl. .................... 429/231.95; 429/231.9; 429/231.1; 429/231.3; 429/231.5

[58] Field of Search .................... 429/218.1, 221, 429/223, 224, 225, 231.1, 231.3, 231.5, 231.9, 231.95

[56] References Cited

U.S. PATENT DOCUMENTS

| | | | |
|---|---|---|---|
| 4,070,529 | 1/1978 | Delmas et al. . | |
| 5,153,081 | 10/1992 | Thackeray et al. . | |
| 5,401,599 | 3/1995 | Tahara et al. . | |
| 5,506,075 | 4/1996 | Iwasaki et al. | 429/218 |
| 5,556,721 | 9/1996 | Sasaki et al. . | |
| 5,622,684 | 4/1997 | Pinnavaia et al. | 423/702 |

FOREIGN PATENT DOCUMENTS

| | | |
|---|---|---|
| 0 615 296 A1 | 9/1994 | European Pat. Off. . |
| 0 680 106 A1 | 11/1995 | European Pat. Off. . |
| 0 744 780 A1 | 11/1996 | European Pat. Off. . |
| 0 794 585 A1 | 9/1997 | European Pat. Off. . |

OTHER PUBLICATIONS

Kirk–Othmer, Encyclopedia of Chemical Technology, vol. 22, 3rd Ed., (Ed. John Wiley & Sons) pp. 360–377 (1978).

M.M. Thackeray, et al., "Spinel Electrodes from the Li–Mn–O System for Rechargeable Lithium Battery Applications," J. Electrochem. Soc., vol. 139, No. 2, pp. 363–366 (Feb. 1992).

Abstract of Japanese Publication No. JP 02 220358 A, published Sep. 3, 1990.

Abstract of Japanese Publication No. JP 08 339804 A, published Dec. 24, 1996.

Abstract of Japanese Publication No. JP 09 171829 A, published Jun. 30, 1997.

G. Pistoia et al., "Direct Comparison of Cathode Materials of Interest for Secondary High–Rate Lithium Cells," Electrochimica Acta, vol. 37, No. 1, pp. 63–68 (1992).

Doron Aurbach, et al., "The Correlation Between the Surface Chemistry and the Performance of Li–Carbon Intercalation Anodes for Rechargeable 'Rocking Chair' Type Batteries," J. Electrochem. Soc., vol. 141, No. 3, pp. 603–611 (Mar. 1994).

Dongyuan Zhao, et al., "Synthesis of Mesoporous Manganosilicates: Mn–MCM–41, Mn–MCM–48 and Mn–MCM–L," J. Chem. Soc., Chem. Commun., pp. 875–876 (1995).

R. Koksbang, et al., "Review: Cathode Materials for Lithium Rocking Chair Batteries," Solid State Ionics, vol. 84, pp. 1–21 (1996).

Masayuki Morita, et al., "Effects of the Organic Solvent on the Electrochemical Lithium Intercalation Behavior of Graphite Electrode," J. Electrochem. Soc., vol. 143, No. 2, pp. L26–L28 (Feb. 1996).

Yoshio Idota, et al., "Tin–Based Amorphous Oxide: A High Capacity Lithium–Ion–Storage Material," Science, vol. 276, pp. 1395–1397 (May 1997).

*Primary Examiner*—Maria Nuzzolillo
*Assistant Examiner*—Angela J. Martin
*Attorney, Agent, or Firm*—Scully, Scott, Murphy & Presser

[57] ABSTRACT

The present invention provides mesostructural metal oxide materials that can be employed in lithium ion rechargeable batteries as intercalation electrodes. The mesostructural metal oxide materials of the present invention maintain their structural integrity during intercalation, are reversible and exhibit increased electrochemical capacity. The use of such mesostructural metal oxides in rechargeable batteries is also described herein.

44 Claims, 11 Drawing Sheets

MESOSTRUCTURAL METAL OXIDE MATERIALS USEFUL AS AN INTERCALATION CATHODE OR ANODE

This invention was made with government support under DAAH04-94-G-0250 awarded by the U.S. Army Research Office. The U.S. government thus has certain rights in this invention.

FIELD OF THE INVENTION

The present invention relates to lithium (Li) ion rechargeable batteries and, in particular, to mesostructural metal oxide materials that can be used as an electrode, i.e. anode or cathode, of such batteries. The present invention thus provides intercalation electrodes which comprise mesostructural metal oxides as one of the electrode components. The present invention further provides a battery system which contains at least one of said electrodes of the present invention therein. A battery system comprising an anode and a cathode both fabricated from a mesostructural metal oxide is also contemplated herein.

BACKGROUND OF THE INVENTION

Lithium ion rechargeable batteries have several important advantages over traditional lead-acid or nickel-cadmium batteries including a higher energy density as well as, being environmentally safe. There are thus numerous consumer markets for a lithium ion rechargeable battery with a reasonable cycle life, retention of capacity and competitive manufacturing cost. Some examples of consumer markets that employ lithium rechargeable batteries include, but are not limited to: cellular phones, lap-top computers, camcorders and the like.

One important factor in the development of such rechargeable batteries is the need to find a cathode material that exhibits high capacity and high energy while being electrochemically reversible. To date, a number of intercalation compounds have been successfully developed and investigated for this purpose. Recently, an article authored by Koksbang, et al. entitled "Review: Cathode Materials for Lithium Rocking Chair Batteries", *Solid State Ionics* 84, 1 (1996) reviewed the properties, preparation procedures and electrochemical performance of different intercalation cathode materials for use in rechargeable lithium rocking chair batteries.

Intercalation cathode compounds such as lithium cobalt oxide ($Li_xCoO_2$), lithium nickel oxide ($Li_xNiO_2$), lithium manganese oxides (spinel phase $Li_xMn_2O_4$) and several vanadium oxides, e.g. $Li_xV_2O_5$, $Li_xV_3O_8$ and $Li_xV_6O_{13}$, are known and are among the most studied of the intercalation compounds. Rechargeable lithium batteries based on the aforesaid intercalation compounds are typically cycled between 2.0 and 4.0 V vs. Li with specific capacities in the range of from about 100 to 120 mAh/g. Despite this, the nickel-, manganese- and vanadium-based intercalation compounds of the prior art suffer a significant loss of capacity with extensive cycling; see, for example, G. Pistoia, et al., "Direct Comparison of Cathode Materials of Interest for Secondary High-Rate Lithium Cells", *Electrochimica Acta* 37, 63 (1992) and B. Scrosati, "Insertion Compounds for Lithium Rocking Chair Batteries" in *The Electrochemistry of Novel Materials*, eds. J. Libkowski and P. N. Ross (VCH Publishers Inc., New York, 1994.

This loss of capacity has been attributed to a number of different factors including irreversible structural changes in the host cathode material accompanying the charge/discharge process. For a complete discussion in regard to this phenomena see, for example, M. M. Thackeray, et al., "Spinel Electrodes from the Li-Mn-O System for Rechargeable Lithium Battery Applications," *J. Electrochem. Soc.* 139, 363 (1992); and K. West, et al. "Vanadium Oxides as Host Materials for Lithium and Sodium Intercalation," in G. Z. Nazri, D. W. Shriver, R. A. Huggins and M. Balanski (eds) *Solids State Ionics II*, Materials Research Society, Pittsburgh, 1991 pp. 449–60. Much research endeavor has been thus spent on improving the reversibility while maintaining or even increasing the electrochemical capacity of intercalation cathode materials. To date, none of the prior art intercalation materials exhibit all of these properties.

In addition to developing new intercalation cathode materials, attention has been directed to improving the anode material of such lithium rechargeable batteries. For example, numerous carbonaceous materials have been investigated for use as the anode of such batteries. It has been observed that the electrochemical behavior of the carbon anode depends not only on the type of carbon materials, but also on the solvent of the electrolyte system used in lithium batteries. For instance, well-crystallized graphite, which appears to be the most attractive carbon anode because of its high capacity (one mole Li per six moles of carbon) and low electrode potential (0.01–0.2 V vs. Li), undergoes different Li-intercalation processes in ethylene carbonate (EC)/propylene carbonate (PC) and EC/dimethyl carbonate (DMC)-based electrolyte solutions. For a complete discussion regarding the electrolyte solvent dependency on graphite anodes see, for example, M. Morita, et al., *J. Electrochem. Soc.* 143, L26 (1996). Moreover, D. Aurbach, et al., *J. Electrochem. Soc.* 141, 603 (1994) has reported that graphite shows negligible reversibility but large irreversible capacity when PC or tetrahydrofuran (THF) were used as the solvent of the electrolyte solution. The irreversible capacity loss of the graphite anode has been attributed to the reduction of PC or THF on the graphite surface during the first Li-intercalation process.

Despite the current state of the art, there is still a need to develop new and improved intercalation cathodes and/or anodes which do not suffer from any of the disadvantages mentioned with prior art intercalation electrodes. That is, there is a need to develop intercalation cathodes and/or anodes that are highly reversible yet maintain or increase their electrochemical capacity without altering the structure of the electrode host material. Moreover, it is desirable to provide a cathode and/or anode that contains a host material that has large, but open channels of mesoscale dimension since the same would result in a material that has high electrochemical capacity and enhanced ionic transport. Such properties can not be afforded with prior art materials such as amorphous, crystalline or spinel-type metal oxides or with prior art carbonaceous materials.

SUMMARY OF THE INVENTION

One object of the present invention is directed to providing new and improved intercalation electrodes which are highly reversible but still exhibit an increased electrochemical capacity even after numerous charge/discharge cycles.

Another object of the present invention is to provide new intercalation cathodes and/or anodes that contain host materials that do not undergo significant structural modification after high cycling rates and deep discharge processes.

A further object of the present invention is to provide intercalation electrodes that contain a host material having a high specific surface area and open site-to-site channels of large dimension which are effective in increasing the ionic diffusion of Li through the electrode host material.

A still further object of the present invention is to provide a Li rechargeable battery system which comprises at least one of the intercalation electrodes of the present invention.

A yet further object of the present invention is to provide a battery system which comprises an intercalation anode of the present invention as well as an intercalation cathode of the present invention.

These and other objects and advantages are achieved in the present invention by utilizing a mesostructural metal oxide as the host cathode and/or anode material. Specifically, the electrode of the present invention comprises: (a) a host material, wherein said host material is a mesostructural metal oxide having the following formula:

$$Li_nQ_xM_yO_z$$

wherein n is from about 0.1 to about 1.1; x is from about 0.5 to about 1.0; y is from about 0.05 to about 0.5; z is about 2; Q is Si, Al, P or mixtures thereof; and M is a transition or a non-transition metal selected from Group VB, VIIB, VIII (noble metals) and IVA of the Periodic Table of Elements (CAS version); (b) an inert organic binder; and (c) a conducting agent.

The inert organic binder and conducting agent which are employed in the present invention are conventional materials typically found in prior art Li ion battery systems. Applicants have determined that due to the physical and chemical nature of mesostructural metal oxides such metal oxides are vastly superior as an electrode component in terms of electrochemical properties compared to prior art metal oxides.

Highly preferred metals, M, employed in the host material of the present invention include: Sn, V, Fe, Co and Mn. It is also preferred that Q is Si. Typically in the present invention, when the mesostructural metal oxide contains a transition metal as M, i.e. V, Co, Ni or Mn, the mesostructural metal oxide is employed as the cathode host material. Likewise, when the mesostructural metal oxide of the present invention contains a non-transition metal as M, i.e. Sn, the mesostructural metal oxide is employed as the anode host material. In the case of Fe, it is contemplated to use mesostructural metal oxides of Fe as an anode host material since prior art iron oxides have been reported for such use.

As stated above, an important feature of the present invention is that the intercalation electrode contains a metal oxide that has a mesostructure. The terms “mesostructure” or “mesostructural” are defined herein as a material that has a well-defined, ordered three-dimensional framework structure having regular channels which have a pore size of from about 2 to about 20 nanometers. The framework itself consists of thin inorganic walls which are usually silicate, aluminosilicate or metal oxide in composition. These walls may also contain phosphorous or boron.

Despite having an ordered, mesoscale framework structure, the interior of the walls which define the framework structure is highly disordered or even amorphous. The mesoscale size of the channels or pores allows for enhanced electrochemical capacity and increased ionic transport. Typically, the framework structures which the mesostructural material of the present invention may be comprised of, include, but are not limited to: lamellar, hexagonal, cubic or like morphologies.

Another aspect of the present invention relates to a Li ion rechargeable battery system. In accordance with this aspect of the present invention, the Li ion rechargeable battery system comprises (a) an anode; (b) a cathode; and (c) an electrolyte having Li ion conductivity, wherein at least one of said anode or cathode is comprised of a mesostructural metal oxide having the formula and properties described herein above. A battery system composed of the aforementioned components is highly reversible and has an increased electrochemical capacity as compared with prior art Li ion battery systems. In one embodiment of the present invention, both the anode and the cathode of the battery system are composed of a mesostructural metal oxide of the present invention. When such an embodiment is contemplated, the cathode preferably comprises a mesostructural manganese or vanadium oxide whereas the anode preferably comprises a mesostructural tin or iron oxide.

DETAILED DESCRIPTION OF THE INVENTION

Figure 1:
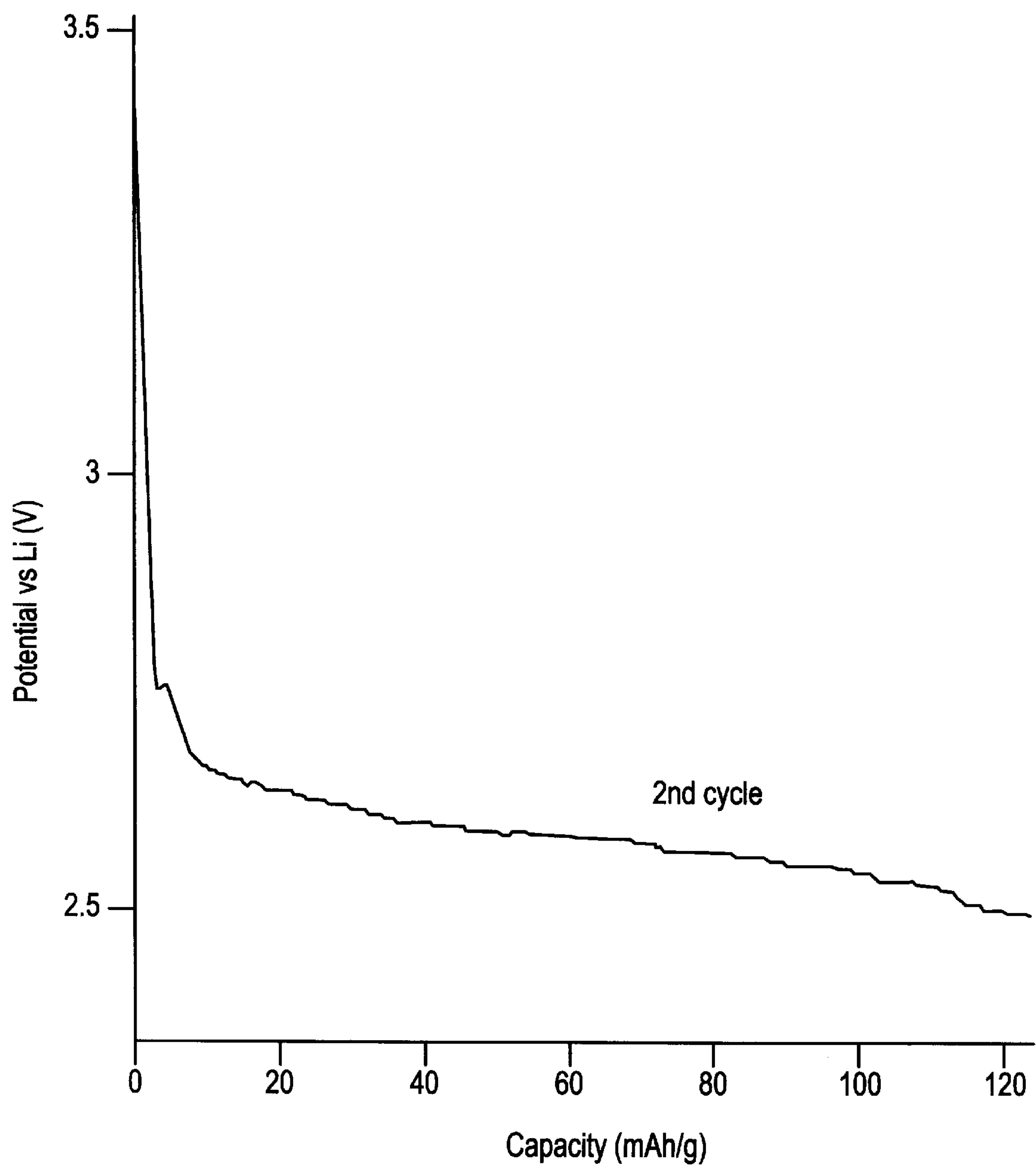
FIG. 1 is the second cycle of the discharge curve of the sample prepared in Example 1; plotted in terms of Potential vs. Li (V) on the y-axis and capacity (mAh/g) on the x-axis.

As stated above, the present invention provides new and improved intercalation electrodes which are capable of intercalating and deintercalating Li ions. In accordance with the present invention, the intercalation electrode of the present invention comprises the following components: (a) a host material, wherein said host material is a mesostructural metal oxide having the formula $$Li_nQ_xM_yO_z$$

wherein n is from about 0.1 to about 1.1; x is from about 0.5 to about 1.0; y is from about 0.05 to about 0.5; z is about 2, Q is Si, Al, P or mixtures thereof; and M is a transition or a non-transition metal selected from Group VB, VIIB, VIII and IVA of the Periodic Table of Elements (CAS version); (b) an inert organic binder; and (c) a conducting agent.

In the above formula, it is preferred that Q be Si. Preferred values for n, x, y and z in the above formula are as follows: n is from about 0.9 to about 1.1; x is from about 0.6 to about 0.8, y is from about 0.2 to about 0.4, and z is from about 1.9 to about 2.1. An example of one of the most highly preferred metal oxides employed in the present invention is $LiSi_{0.7}Sn_{0.3}O_2$.

When a cathode is desired, the host material of the present invention typically contains a transition metal selected from Group VB, VII and VIII of the Periodic Table of Elements. Illustrative examples of transition metals that can be employed as the cathode host material include, but are not limited to: V, Mn, Co, Ni, Ru and the like. Of these transition metals, it is highly preferred that the cathode host material be composed of V or Mn.

When an anode is desired, the host material of the present invention typically contains a non-transition metal selected from Group IVA of the Periodic Table of Elements, or Fe. Of these metals, it is preferred that the anode host material be composed of Sn or Fe.

An essential aspect of the metal oxides used in forming the intercalation electrode of the present invention is that the metal oxides have a mesostructural morphology. This means that the morphology of the metal oxides of the electrode host material of the present invention is not entirely crystalline (having a high degree of order) or amorphous (having no order). Rather, the morphology of the electrode host material of the present invention has some order as well as some disorder associated with it. Specifically, the mesostructural material of the present invention are well-defined, ordered three-dimensional framework structures. The framework structure is ordered in either a lamellar, hexagonal or cubic morphology with regular channels having a pore size of from about 2 to about 20 nanometers. A preferred pore size of the mesostructural metal oxides of the present invention is from about 2 to about 10 nanometers.

The framework structure of the metal oxide itself consists of thin inorganic walls which are usually silicate, alumino-silicate or metal oxide in composition. Despite having an ordered framework structure, the interior structure of the inorganic walls is highly disordered or even amorphous.

The mesostructural metal oxides of the present invention are further characterized as having a surface area of from about 650 to about 1400 $m^2/g$ and a pore volume of from about 0.1 to about 0.6 cc/g. More preferably, the mesostructural metal oxides of the present invention have a surface area of from about 750 to about 1250 $m^2/g$ and a pore volume of from about 0.2 to about 0.5 cc/g.

A number of different classes of mesostructural metal oxides of the above formula are possible in the present invention. These include the following materials:

(A) Silicate-based mesostructures with metal ions partially substituted for silicon atoms in the mesostructural walls;

(B) Pure metal oxide mesostructures;

(C) Silicate-based mesostructures impregnated with metal oxide species; and (D) Non-silicate-based framework structures (e.g. aluminate, aluminosilicate, phosphate and the like) with metal atoms partially substituted as in (A), or impregnated as in (C).

The generic methods used in forming the mesostructural material of Class A–D are described below with specific examples of the methods found in the examples. It should be noted that methods used in forming the Class D materials are the same as those of Class A and C with the exception that the silicate-based material is substituted with a non-silicate based material.

The mesostructural materials in Class A (and Class D), which substitute metal atoms in the silicate walls, are prepared in accordance with the process disclosed in D. Zhao, et al., "Synthesis of Mesosporous Manganosilicates: Mn-MCM-41, Mn-MCM-48 and MnMCM-L", *J. Chem. Soc. Chem. Commun.*, 875 (1995). Specifically, to prepare the metal-substituted mesostructural materials of the present invention two synthetic procedures may be employed. In the first synthetic process, a cationic or a nonionic surfactant is pH-adjusted to a pH of from about 10 to about 13 by contacting the same with a conventional base. In an alternative embodiment of the present invention, the pH may be adjusted to a pH of from about 5 to 7 by contacting the same with a conventional acid. The pH adjusted solution is then combined with a metal salt e.g. $MnCl_2$ and a silicate source such as tetraethyl orthosilicate (TEOS) under conditions to form a gel.

Suitable cationic surfactants that may be employed in the present invention include oxygen-free amines, oxygen-containing amines and quaternary ammonium salts. Examples of oxygen-free amines include aliphatic mono-, di- and polyamines derived from fatty and rosin acids. Primary, secondary and tertiary monoamines containing from 10 to 22 alkyl or alkenyl groups consistute the bulk of this class. An illustrative example of such a cationic surfactant is $CH_3(CH_2)_{11}N(CH_3)_3$.

The oxygen-containing amines employed in the present invention include amine oxides, ethoxylated alkylamines, 1-(2-hydroxyethyl) 2-imidazolines and alkoxylates of ethylenediamine. Such compounds are well known to those skilled in the surfactant industry. An illustrative example of an oxygen-containing amine that can be employed in the present invention is $CH_3(CH_2)_{11}N(CH_3)_2CH_2OH$.

The term "quaternary ammonium compound" is used herein to denote dialkyldimethylammonium salts, alkylbenzyldimethylammonium chloride, alkyltrimethylammonium salts or alkylpyridinium halides. Typically the alkyl chain in these compounds is a straight, branched or cyclic alkyl containing from about 10 to 22 carbon atoms. Illustrative examples of quaternary ammonium compounds that can be employed include cetyltrimethylammonium chloride (CTAC), cetyltrimethylammonium bromide (CTAB), cetyltrimethylammonium hydroxide (CTAOH) and the like.

Highly preferred cationic surfactants employed in the present invention include CTAB, CTAOH and CTAC.

The nonionic surfactants that may be employed in the present invention include polyoxyethylene (ethoxylates), alcohol ethoxylates, alkylphenol ethoxylates, carboxylic acid esters, glycerol ethers, polyoxyethylene esters, anhydrosorbitol esters, ethoxylated esters, ethoxylated natural fats, oils or waxes, glycol esters of fatty acids, carboxylic amides, diethanolamine condensates, monoalkanolamine condensates, polyoxyethylene fatty acid amides, polyalkylene oxide block copolymers and poly (oxyethylene-co-oxypropylenes). Such nonionic compounds are also well known, and examples of the same can be found, for example, in Kirk-Othmer, "Encyclopedia of Chemical Technology, Vol. 22, 3rd Ed., (Ed. John Wiley & Sons), 1978 pp. 360–377. Preferred nonionic surfactants that can be employed in the present invention include poly(ethylene oxide)-based surfactants.

In the present invention, from about 7 to about 15 wt % of surfactant is added to a solution comprising from about 10 to about 40% metal salt and from about 30 to about 60% of silicate source. Illustrative examples of silicate sources include TEOS, TMOS and $Na_2SiO_3$.

The term "metal salts" denotes the halides or acetates of Group VB, VII, IVA and VII of the Periodic Table of Elements. Examples of such metal salts include $MnCl_2$, $VCl_4$, $SnCl_4$, $FeCl_3$, $FeCl_2$, $MnBr_2$, Mn acetate, Fe acetate and the like. The specific metal salt chosen will depend upon the type of material (cathode/anode) desired.

The contact between the metal salt, pH-adjusted solution and silicate source is carried out at a temperature of from about 100° to about 180° C. for a period of from about 12 to about 72 hrs. and under mixing conditions effective to cause gel formation.

In the second synthetic route, a gel is formed by the addition of a silicate source such as a solution of sodium silicate and HCl or LIOH to a solution of a surfactant such as CTAC or CTAB and a metal salt, e.g, $MnCl_2$, $VCl_4$ or the like.

When the second synthetic route is employed the LiOH or HCl is present in an amount of from about 0.5 to about 1.5 M based on 1 gram of silicate. More preferably, the amount of LiOH or HCl employed is from about 0.5 to about 1.0 M.

The other conditions and amounts employed in the second synthetic route are identical to those mentioned hereinabove.

In both of these synthetic routes, the resultant gel or suspension is then heat treated under conditions that are effective to convert said gel or suspension into a mesostuctural powdered product. Specifically, in the present invention this heat treatment is conducted at a temperature of from about 100° to about 180° C. and for a time period of from about 12 to about 72 hrs. More preferably, this heat treatment is carried out at a temperature of from about 150° to about 180° C. for a time period of from about 24 to about 48 hrs.

After conducting the above heat treatment step, the resultant mesostructural product is calcined in oxygen or air at a temperature of from about 450° to about 600° C. for a time period of from about 3 to about 15 hrs. More preferably, the calcination step is conducted at a temperature of from about 500° to about 550° C. for a time period of from about 6 to about 10 hrs. Without wishing to be bound by any theory, it is believed that the calcination step causes the removal of the templating compound, i.e. surfactant, from the mesostructural product.

The Class B mesostructural compounds, i.e. metal oxide framework mesostructural material, contain a metal oxide framework rather than a silicate or aluminosilicate framework. These mesostructural materials are synthesized using procedures well known to a skilled artisan. Specifically, these mesostructural materials are prepared by using any of the following methods. In a first method, a gel is formed by contacting a metal salt (from about 0.2 to about 0.6 M) and LiOH (from about 0.5 to about 1.0 M) in the presence of a cationic or nonionic surfactant (from about 5 to about 15 wt %). In the second method, a gel is formed by the addition of a metal hydroperoxide and LiOH or LiAc (from about 0.5 to about 1.0 M) to a poly(ethylene oxide) solution (from about 5 to about 15 wt %). Both of these reactions are carried out at a temperature of from about 130° to about 180° C. for a time period of from about 12 to about 48 hrs. with continuous stirring.

In either method, the gel is first heat treated as described hereinabove and then calcined using the conditions also described hereinabove.

The Class C mesostructural material of the present invention, which comprises impregnation of a silicate-based mesostructural material, is also prepared using techniques well known to those skilled in the art. Specifically, the mesostructural material is prepared using art recognized techniques such as described in A or D above. After preparing the mesostructural-based material, it is heated in an inert gas atmosphere such as argon at a temperature of from about 500° to about 550° C. for a period of time of from about 4 to about 10 hrs. After this heat treatment step, the material is heated in the presence of oxygen under conditions effective to replace the organic cation ($R^+$) with protons, leaving silanol groups inside the channels according to the equation $Si—O^-(R^+)\rightarrow Si—OH$.

Next, the walls of the silicate-based structure containing said silanol groups are impregnated by contacting the heat treated mesostructural material with a solution of a metal salt (of from about 0.5 to about 2 M) dissolved in an appropriate organic solvent. The organic solvents employed in the present invention are selected from the group consisting of alcohols, ethers, hydrocarbon and esters.

The reaction occurs at a temperature of from about 20° to about 80° C. and for a period of time of from about 6 to about 24 hrs. After contacting the impregnated material, it is separated and then washed with an organic solvent to remove any metal salt that is not impregnated into the channels of the silicate-based mesostructural material. Typically, this impregnation provides a material which contains of from about 10 to about 20 wt % of metal ions impregnated in the framework structure. After separation and washing, the metal-containing mesostructural material is calcined as described hereinabove.

It is again emphasized that aluminate, aluminosilicate or phosphate sources may be substituted for silicate sources mentioned hereinabove.

As stated above, the mesostructural material thus obtained can be used as the electrode host material in a Li ion battery. That is, the mesostructural material of the present invention can be used to incorporate and release Li ions. In addition to containing a mesostructural metal oxide, the electrode of the present invention also contains a conventional binder and a conducting agent.

The binders that are employed in the present invention are well known inert organic polymers or copolymers including, but not limited to: polyethylene, polytetrafluroethylene (PTFE), poly(vinylidene fluoride (PVDF), poly(ethylene oxide) (PEO) and the like. A highly preferred binder employed in the present invention is PVDF. The binder is typically employed as a suspension which is dispersed in a dispersing agent such as water, ethanol or one of the above-mentioned nonionic surfactants such as polyoxyethylene alkylphenyl ether or 1-methyl-2-pyrolidinone.

The third component of the electrode of the present invention is a conventional conducting agent. Suitable conducting agents that can be employed in the present invention include carbon, e.g. graphite, W, Ta, Cu, Cr, and the like. A highly preferred conducting agent employed in the present invention is graphite or carbon black.

In accordance with the present invention, the electrode contains from about 75 to about 90 weight % of component (a), i.e. the mesostructural material; from about 5 to about 15 weight percent of component (b), i.e. the binder; and from about 5 to about 10 weight percent of component (c), i.e. the conducting agent. More preferably, the electrode contains from about 80 to about 85 weight % of component (a); from about 10 to about 12 weight percent of component (b); and from about 5 to about 8 weight percent of component (c).

The electrodes of the present invention are fabricated using conventional techniques well known to those skilled in the art. For example, the electrode can be prepared by mixing a powder of the mesostructural metal oxide material of the present invention with the conventional binder and the conventional conducting agent. The dried mixture is then pressed at a pressure of from about 40 to about 50 ton/inch$^2$ into a pellet having a diameter of from about 10 to about 13 mm. This pellet contains from about 10 to about 25 mg of the mesostructural metal oxide. The cathode pellet is thereafter dried at a temperature of from about 100° to about 140° C. for about 6 to 24 hrs before the cell is assembled under an argon atmosphere in a dry box.

Another aspect of the present invention relates to a Li ion battery system which comprises an anode, a cathode, and an electrolyte, wherein either or both of said anode and cathode contains a mesostructural metal oxide as the host material.

When a mesostructural metal oxide of the present invention is employed as the host cathode material, the anode may be composed of a conventional anode material or a mesostructural metal oxide material of the present invention. Suitable anode materials which can be employed include, but are not limited to: carbon, Li metal and the like, as well as mesostructural tin oxide or iron oxide prepared in accordance with the present invention. When a mesostructural metal oxide of the present invention is not employed as the anode host material, it is preferred that the anode be composed of Li metal or an appropriate carbon material.

When the battery system of the present invention comprises a mesostructural metal oxide as the anode host material, conventional cathode materials including, but not limited to: $V_2O_5$, $MnO_2$, $Li_xCoO_2$, $Li_xNiO_2$ and $Li_xMn_2O_4$ may be employed. Also contemplated as the cathode host material is a mesostructural metal oxide of the present invention.

The electrolytes which can be employed in the battery system of the present invention include known electrolytes which have Li ion conductivity. Suitable electrolytes include, but are not limited to: non-aqueous electrolyte solutions where a dissociable Li salt such as $LiClO_4$, $LiPF_6$, $LiBF_4$, $LiCF_3SO_3$ is used in conjunction with at least one organic solvent such as γ-butyrolactone, propylene carbonate, ethylene carbonate, butylene carbonate, dimethyl carbonate, methylformate, 1,2-dimethoxyethane, tetrahydrofuran, dioxolane and dimethylformamide. In addition to the above described non-aqueous electrolytes, the present invention also contemplates the use of a polymer solid electrolyte wherein the above mentioned Li salt is a solid solvated into a polymer such as polyethylene oxide; a gel electrolyte; or an inorganic solid electrolyte such as $Li_3N$ LiI and the like.

The battery system of the present invention may also contain conventional separators, current collectors and the like.

The intercalation electrodes of the present invention containing the mesostructural metal oxides as the electrode host material offer the following critical advantages over prior art electrodes used in Li ion batteries:

(I) The mesostructural material of the present electrode has an essentially open framework structure consisting of walls whose internal structure is highly disordered or even amorphous, consequently reduction/oxidation will not significantly alter the local structure about the metal ions, thus increasing the electrochemical reversibility;

(II) The mesostructural material of the present electrode has a high specific surface area which leads to increased practical capacity;

(III) The mesostructural material of the present electrode has open channels of large dimension which leads to increased ionic transport through the host material; and (IV) There is a great variability in the nature of mesostructural materials of the present electrode providing significant latitude for the optimization of electrochemical performance via structural and compositional modifications.

The following examples are given to illustrate the scope, spirit and the advantages of the present invention. Because these examples are given for illustrative purposes only, the invention embodied therein should not be limited thereto.

EXAMPLE 1

In this example, a manganese-substituted mesostructural material was prepared in accordance with one aspect of the present invention and the electrochemical properties of the same were determined. Specifically, the manganese-substituted mesostructural material was prepared as follows: A manganese silicate gel was prepared by first dissolving 1.05 g lithium hydroxide ($LiOH.H_2O$), 1.73 g manganese acetate and 7.80 g cetyltrimethylammonium bromide (CTAB) in 60 ml distilled water at 80° C. To this solution was added 10.44 g tetraethyl orthosilicate under constant stirring, and the formation of a manganese silicate gel was observed. The relative amounts of the reactants used (molar ratios) to produce the manganese silicate gel are as follows:

1 $SiO_2$:0.20 $MnO_2$:0.25 $Li_2O$:0.45 CTAB:65 $H_2O$

The thus formed gel was stirred at 90° C. for about four hours and transferred to a Parr pressure reactor wherein it was then heat treated at 175° C. for about 42 hours. The resultant product was filtered, washed with distilled water and calcined at 500° C. for about 4 hours to form a mesostructural product.

Electrochemical testing was carried out using a two electrode cell with a mesostructural-based Mn composite as the cathode, lithium metal foil as the anode, and a 1 M solution of $LiClO_4$ in an equimolar mixture of propylene carbonate and 1,2-dimethoxycarbonate as the electrolyte. A Celgard 2400 (trademark) thin film was used as the separator. The composite cathode was prepared by mixing the above described powdered product (83 wt %) with 15 wt % Ketjan carbon black and 2 wt % polyvinylidene fluoride (PVDF) binder in an ethanol solution and then drying the same. The dried mixture was pressed at 50 tons/inch$^2$ pressure into a 13 mm diameter pellet which contained about 20 mg of the active mesostructural composite. The cathode pellet was dried at 200° C. for about 2 hours before the cell was assembled under an argon atmosphere in a dry box.

The charge/discharge tests were performed with an EG&G Model 263 Potentiostat/Galvanostat at a constant current density of about 0.13 mA/cm$^2$ and cut-off potentials of 3.5 to 2.5 V vs. Li. The discharge behavior of the mesostructural cathode is shown in FIG. 1 for the second cycle. The capacity was calculated from the weight of the cathode, the current and the elapsed time of discharge. Specifically, FIG. 1 shows the discharge behavior of a lithium battery using the mesostructural cathode.

In addition to performing the above electrochemical testes, TEM measurements were obtained using a JEN-2000FX electron microscope at 200 kV. The TEM image showed that the mesostructural Mn-based cathode material had a pore structure in a lamellar morphology with a pore size of about 4 nm. These data provide positive proof that the composite cathode material formed in this example is mesostructural.

EXAMPLE 2

In this second example, a manganese oxide framework mesostructural material was prepared using an alternative method of the present invention. Specifically, a manganese-containing suspension was first prepared by dissolving 4.20 g lithium hydroxide ($LiOH.H_2O$), 12.60 g manganese chloride and 9.9 g polyethylene glycol mono-p-nonylphenyl ether (n=10), in 150 ml distilled water at 80° C. The relative amounts of the reactants used (molar ratios) to produce the manganese suspension are as follows:

1 $MnO_2$:0.5 $Li_2O$:0.15 PEO surfactant:80 $H_2O$

The gel was then stirred at 90° C. for about 4 hours and transferred to a Parr pressure reactor wherein it was then heat treated at 170° C. for about 72 hours until a suspended powder was formed. The resulting product was filtered, washed with distilled water and calcined at 500° C. for about 4 hours.

Figure 2:
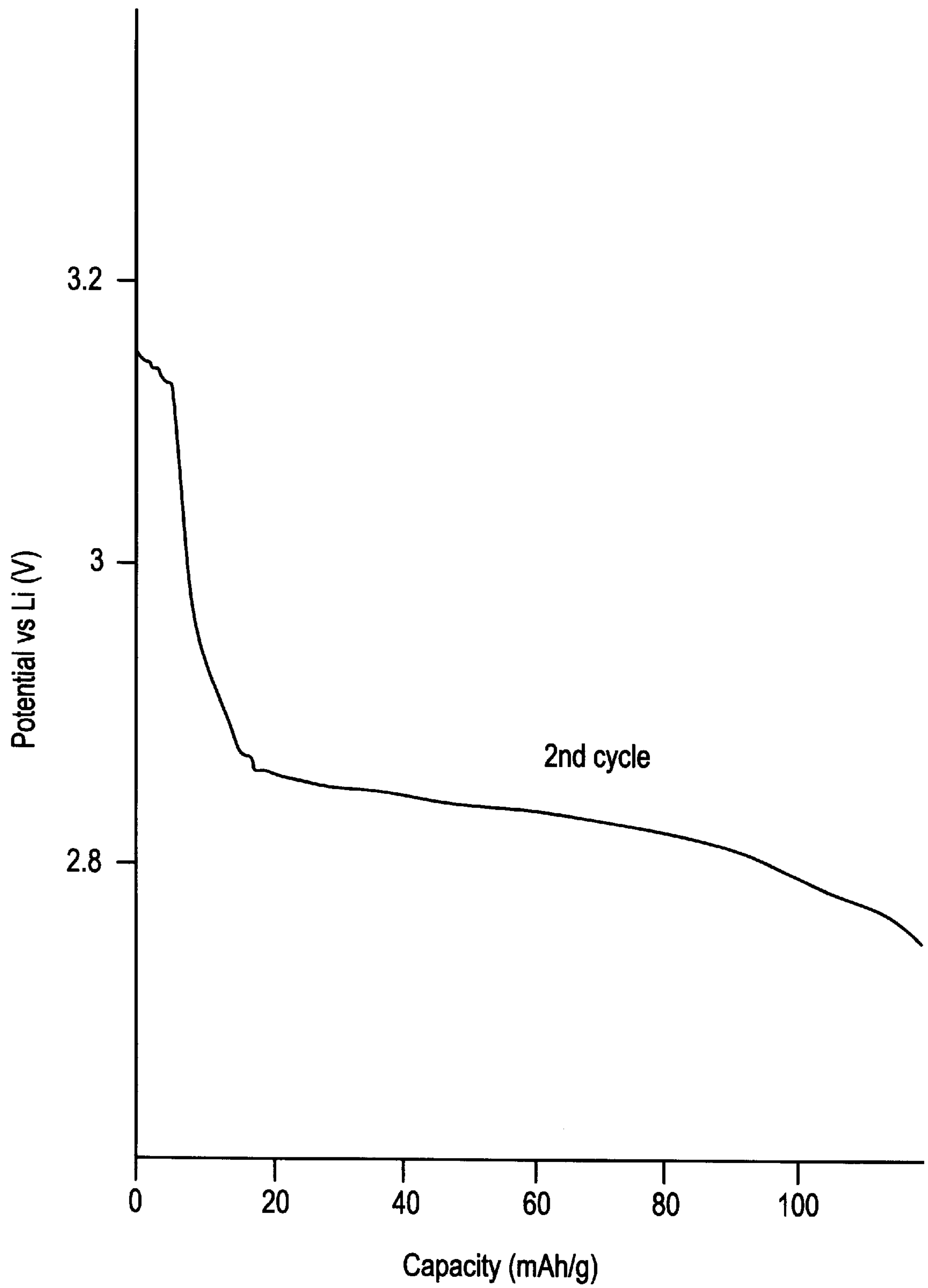
FIG. 2 is the second cycle of the discharge curve of the sample prepared in Example 2; plotted in terms of Potential vs. Li (V) on the y-axis and capacity (mAh/g) on the x-axis.

The electrochemical characterization was carried out as in Example 1, except that the discharge current density was 0.15 mA/$cm^2$. The second cycle of the discharge curve is shown in FIG. 2. Specifically, this figure shows a capacity of 124 mAh/g.

TEM measurements of this Mn oxide framework mesostructural material was performed using the procedure described in Example 1. The TEM image showed that this material had a pore structure in a hexagonal morphology with a pore size of about 5 nm.

EXAMPLE 3

A manganese-substituted mesostructural material was prepared by first dissolving 1.05 g lithium hydroxide ($LiOH.H_2O$), 2.87 g manganese nitrate and 7.8 g CTAB in 75 ml distilled water at 20° C. To this solution was added 6.12 g sodium silicate (N brand, 27% silica, Aldrich) and the formation of the manganese silicate suspension was observed. The relative amounts of the reactants used (molar ratios) to produce the manganese silicate gel are as follows:

1 $SiO_2$:0.20 $MnO_2$:0.25 $Li_2O$:0.45 CTAB:80 $H_2O$

The gel was stirred at 90° C. for about 4 hours and transferred to a Parr pressure reactor wherein it was then heat treated at 170° C. for about 36 hours. The resulting product was filtered, washed with distilled water and calcined at 500° C. for about 4 hours.

Figure 3:
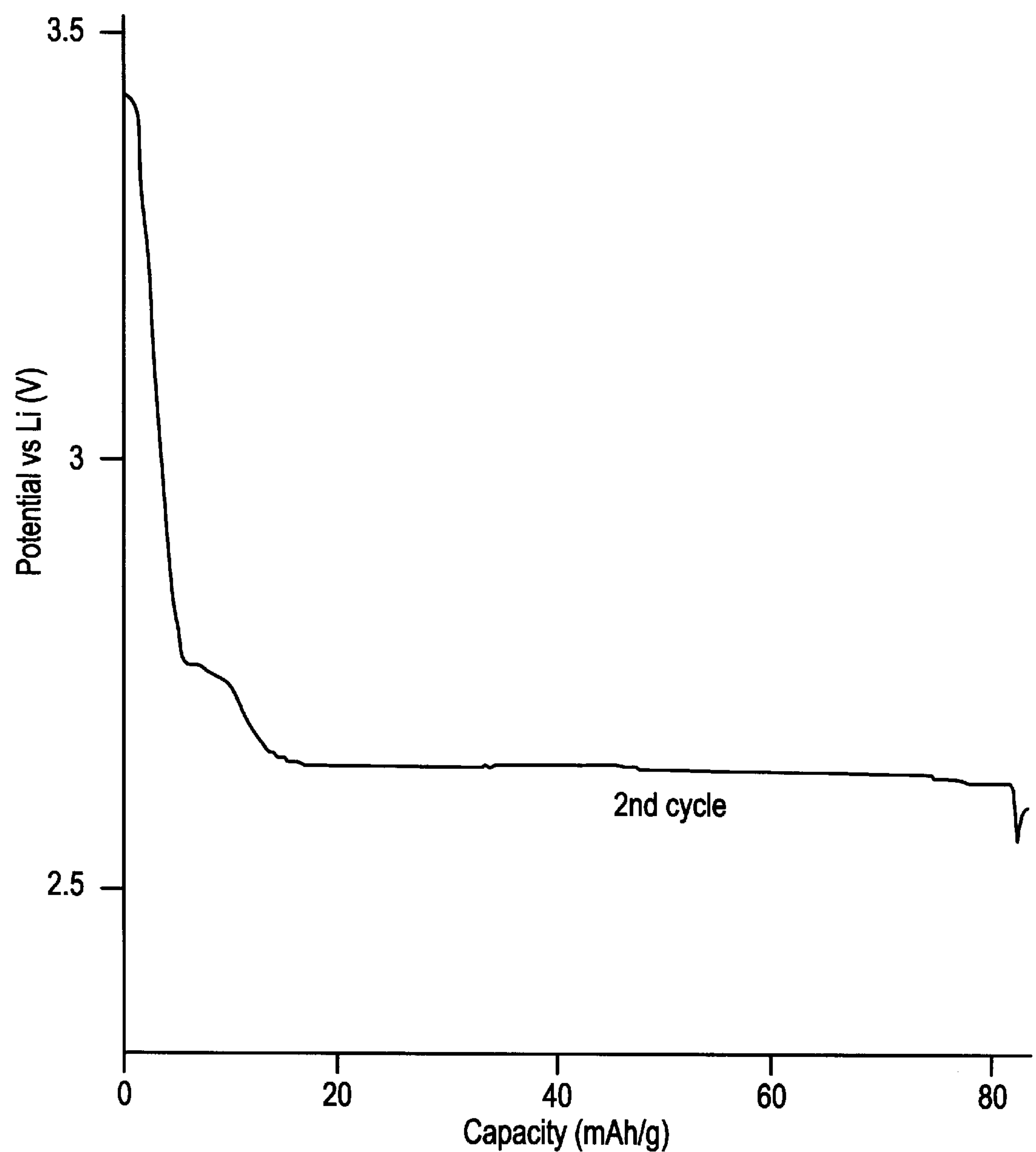
FIG. 3 is the second cycle of the discharge curve of the sample prepared in Example 3; plotted in terms of Potential vs. Li (V) on the y-axis and capacity (mAh/g) on the x-axis.

The electrochemical characteristics were carried out as described in Example 1. The second discharge curve is shown in FIG. 3, wherein a capacity of 84 mAh/g is shown.

EXAMPLE 4

A manganese silicate gel was prepared by first dissolving 1.12 g lithium hydroxide ($LiOH.H_2O$) 14.39 g manganese nitrate ($Mn(NO_3)_2.6H_2O$), and 4.8 g CTAB in 160 ml distilled water at 20° C. To this solution was added tetraethylorthosilicate and the formation of a manganese silicate gel was observed. The relative amounts of the reactants used (molar ratios) to produce the manganese silicate gel are as follows:

1 $SiO_2$:1 $MnO_2$:0.25 $Li_2O$:0.25 CTAB:180 $H_2O$

Figure 4:
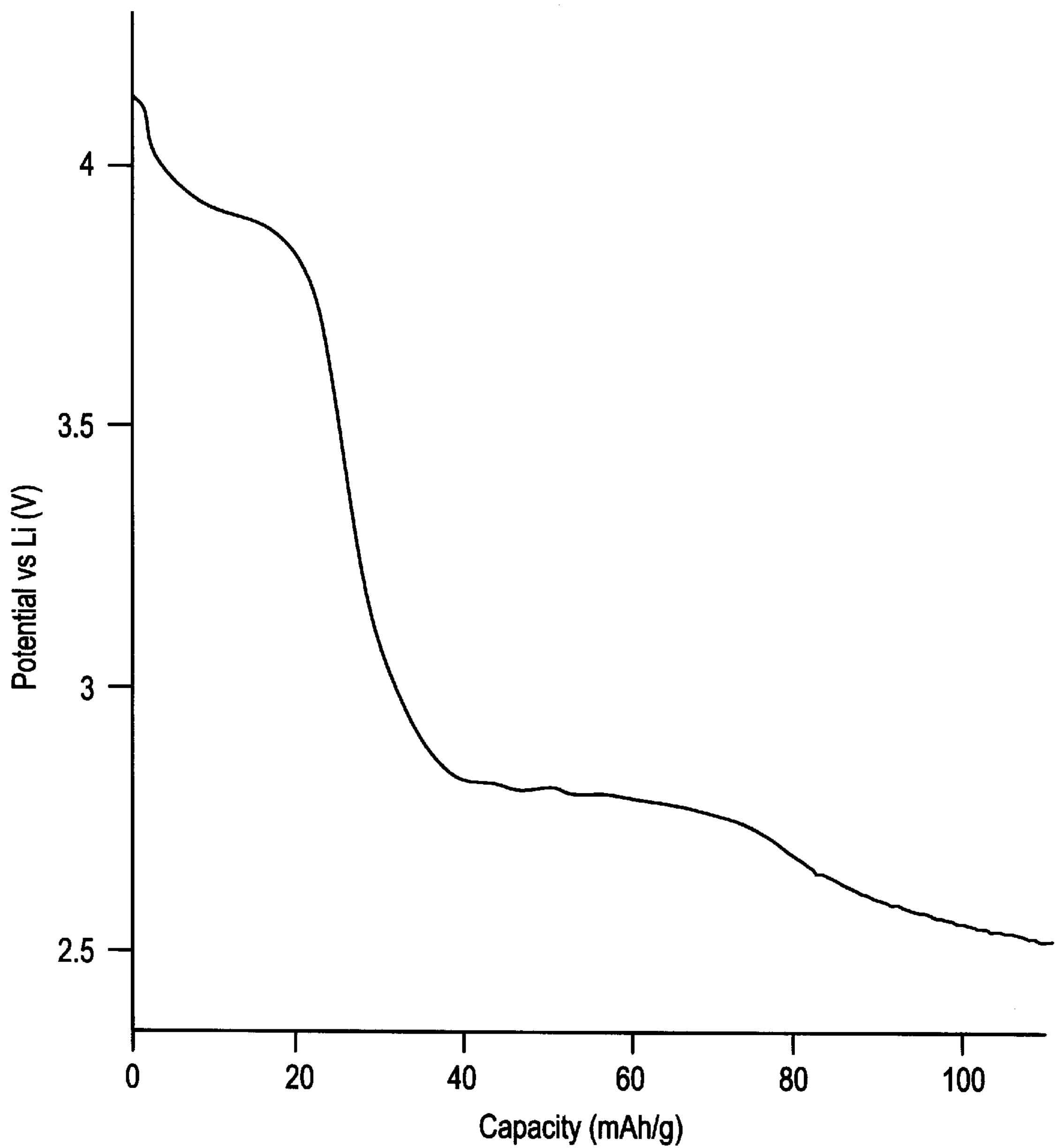
FIG. 4 is the second cycle of the discharge curve of the sample prepared in Example 4; plotted in terms of Potential vs. Li (V) on the y-axis and capacity (mAh/g) on the x-axis.

The gel was stirred at 75° C. for about 4 hours and transferred to a Parr pressure reactor wherein it was heat treated at 165° C. for about 36 hours. The resulting product was filtered, washed with distilled water and calcined at 550° C. for about 4 hours. The electrochemical characterization was carried out using the procedure described in Example 1, expect that the voltage range was 4.3 to 2.5 V. The second cycle of the discharge voltage in shown in FIG. 4. Specifically, the figure shows a capacity of 117 mAh/g.

EXAMPLE 5

A manganese silicate gel was prepared by first dissolving 1.12 g lithium hydroxide ($LiOH.H_2O$), 14.02 g manganese nitrate ($Mn(NO_3)_2.6H_2O$), 10 ml of 37% HCl and 4.75 g CTAB in 160 ml distilled water at 20° C. To this solution was added 10.62 g tetraethylothrosilicate and the formation of a manganese silicate gel was observed. The relative amounts of the reactants used (molar ratios) to produce the manganese silicate gel are as follows:

1 $SiO_2$:1 $MnO_2$:0.25 $Li_2O$:5.4 HCl:0.26 CTAB:180 $H_2O$

Figure 5:
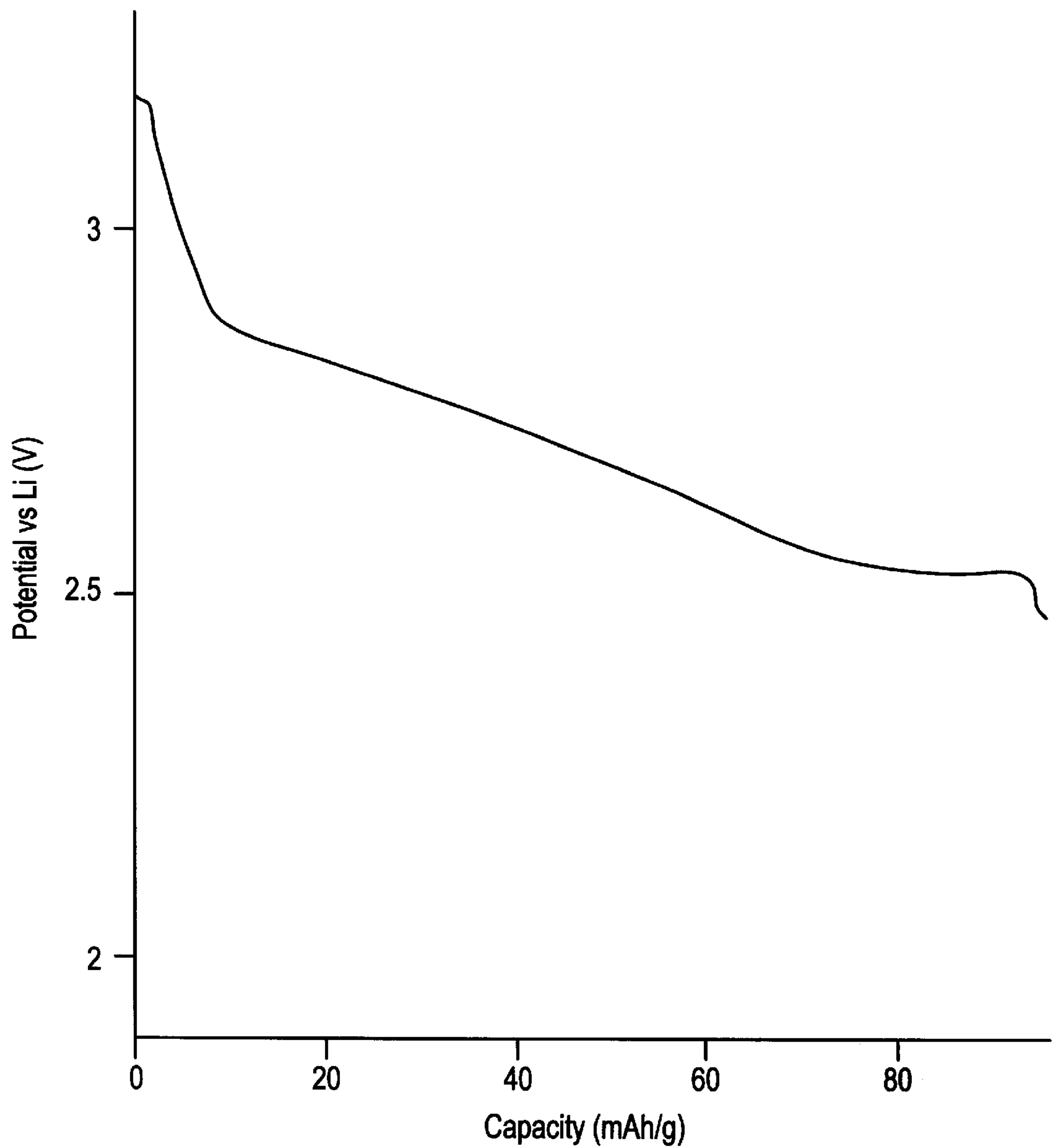
FIG. 5 is the second cycle of the discharge curve of the sample prepared in Example 5; plotted in terms of Potential vs. Li (V) on the y-axis and capacity (mAh/g) on the x-axis.

The gel was stirred at 75° C. for about 8 hours and transferred to a Parr pressure reactor wherein it was heat treated at 167° C. for about 40 hours. The resulting product was filtered, washed with distilled water and calcined at 500° C. for about 4 hours. The electrochemical characterization was carried out using the procedure described in Example 1, expect that the voltage range was 3.3 to 2.5 V. The second cycle of the discharge voltage in shown in FIG. 5. Specifically, FIG. 5 shows a capacity of 98 mAh/g.

EXAMPLE 6

In this example, a tin oxide material was prepared by utilizing the sol-gel synthesis process described in the herein above. Specifically, the tin oxide material was prepared by added tin (IV) acetate (2.5 g) to a 2 M LiOH solution (the Li:Sn ratio was equal to 2:1) and this suspension was agitated at 70° C. overnight. The precipitate thus formed was filtered, washed with distilled water and dried in a vacuum over at 110° C. for about 6 hours. The final product was obtained upon heating the precipitate at 400° C. for about 4 hours.

Figure 6:
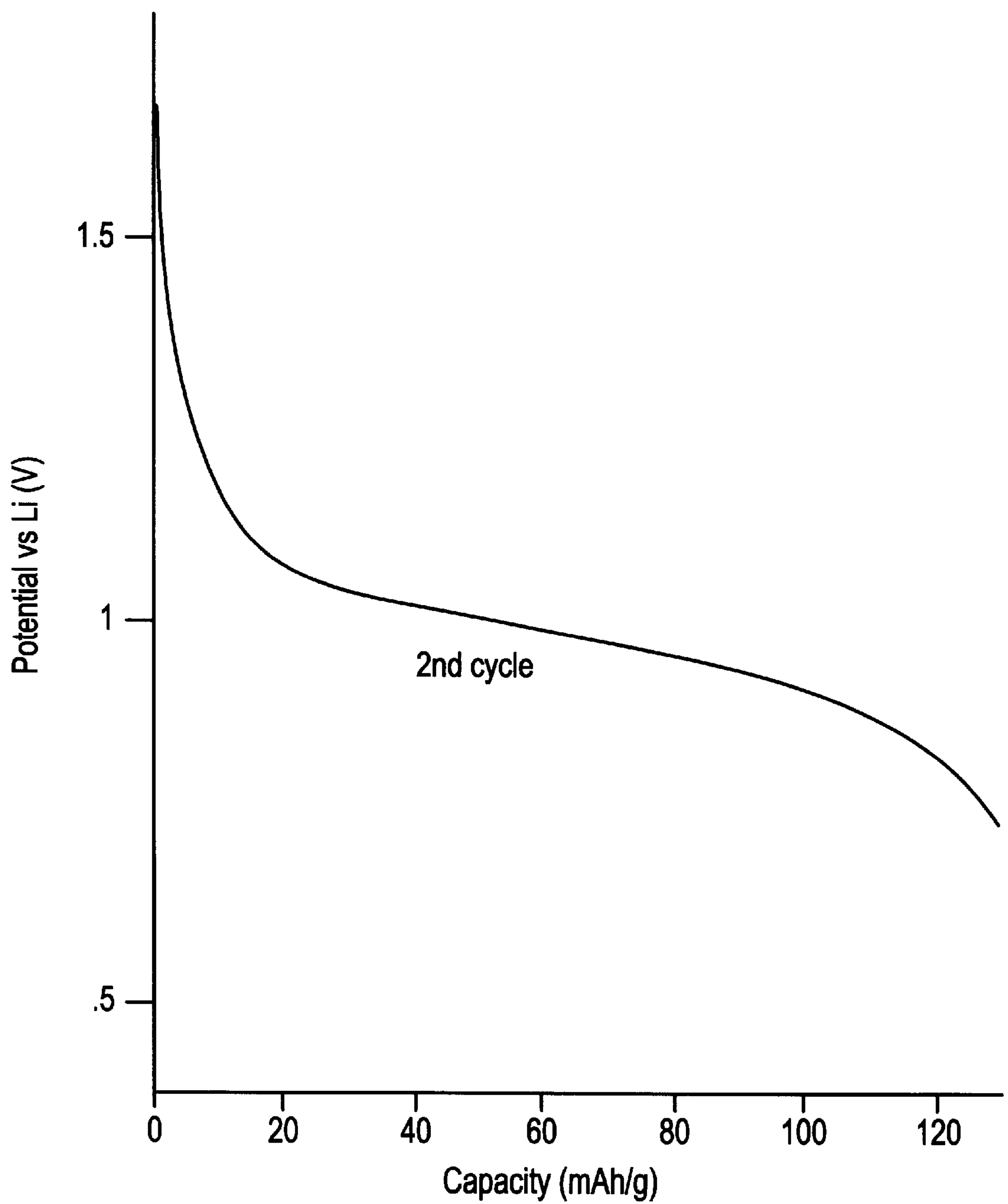
FIG. 6 is the second cycle of the discharge curve of the sample prepared in Example 6; plotted in terms of Potential vs. Li (V) on the y-axis and capacity (mAh/g) on the x-axis.

The electrochemical characteristics were determined as in Example 1 except that metallic lithium was used as the anode and the $SnO_2$ composite was employed as the cathode. Although $SnO_2$ is intended for use as an anode, it is conventional to test its electrochemical performance by utilizing it as a cathode in a test cell where metallic lithium functions as the anode. The second cycle discharge curve is shown in FIG. 6, which shows a capacity of 126 mAh/g.

EXAMPLE 7

A tin-containing gel was first prepared by dissolving 18.9 g of $SnCl_4$ and 13.6 g sodium ethoxide in 150 ml distilled water at 20° C. To this solution was added 8.65 g of poly(ethylene)oxide (PEO)-based nonionic surfactant and 7.62 g lithium hydroxide and 125 ml distilled water. The following relative amounts (molar ratios) of the reactant were used:

1 $SnO_2$:1 $LiO_2$:0.15 PEO-based surfactant:120 $H_2O$

The gel was agitated at room temperature for about 2 hours and then placed in a Parr pressure reactor and stirred at 160° C. for about 48 hours. The product was filtered, washed with distilled water and dried under vacuum. The PEO surfactant was removed by calcining the product at 520° C. for about 10 hours.

Figure 7:
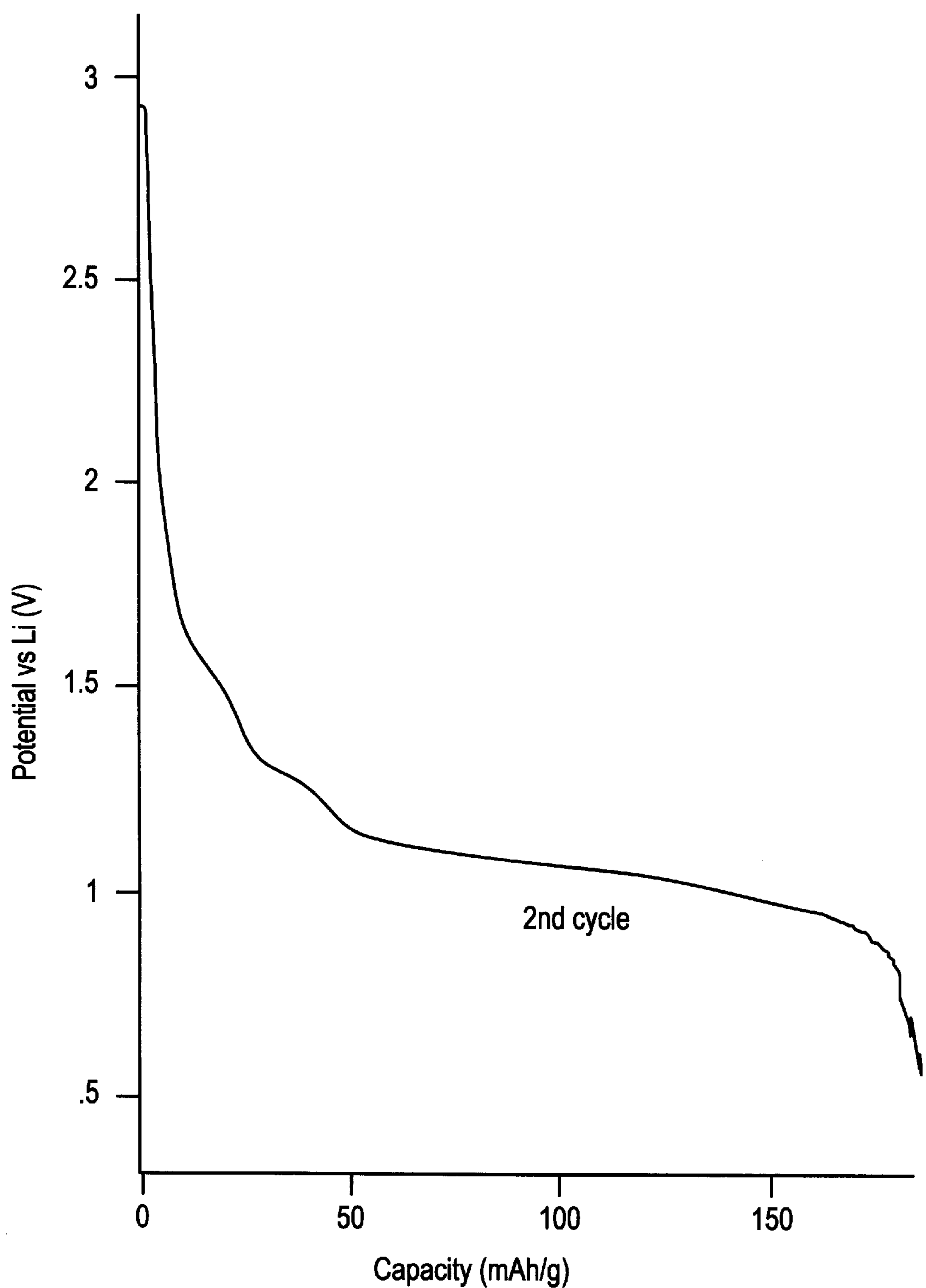
FIG. 7 is the second cycle of the discharge curve of the sample prepared in Example 7; plotted in terms of Potential vs. Li (V) on the y-axis and capacity (mAh/g) on the x-axis.

The electrochemical characteristics of this material were determined using the procedure of Example 6 and the resultant second cycle of the discharge curve is shown in FIG. 7. FIG. 7 shows a capacity of 121 mAh/g.

EXAMPLE 8

A tin-containing gel was first prepared by dissolving 12.9 g of $SnCl_4$ and 5.23 g lithium hydroxide in 150 ml distilled water at 20° C. To this solution was added 7.12 g of CTAB. The following relative amounts (molar ratios) of the reactant were used:

1 $SnO_2$:1 $LiO_2$:0.30 CTAB:120 $H_2O$

The gel was agitated at room temperature for about 2 hours and then placed in a Parr pressure reactor and stirred at 75° C. for about 24 hours. The product was filtered, washed with distilled water and dried under vacuum. CTAB was removed by calcining the product at 520° C. for about 10 hours.

Figure 8:
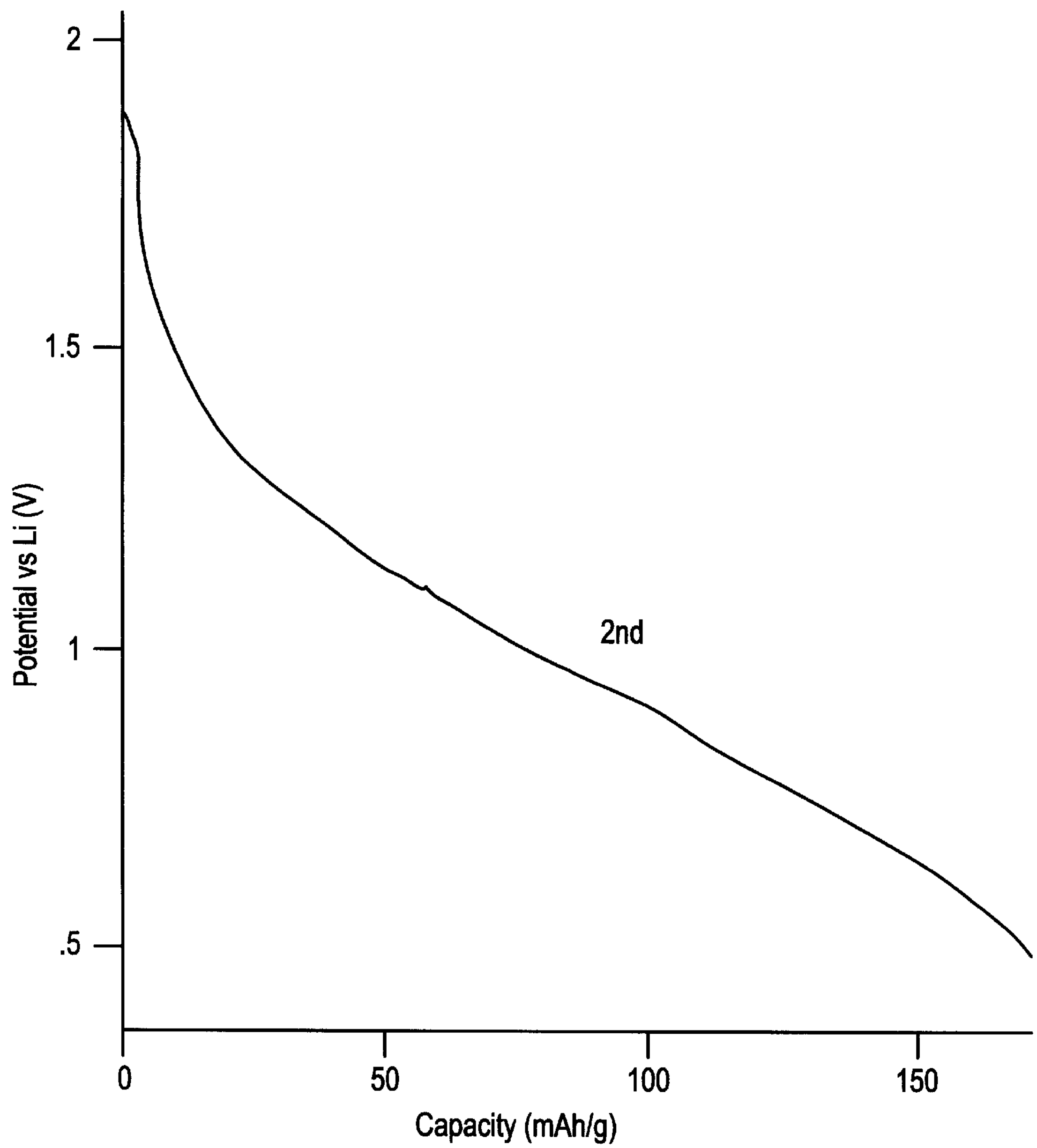
FIG. 8 is the second cycle of the discharge curve of the sample prepared in Example 8; plotted in terms of Potential vs. Li (V) on the y-axis and capacity (mAh/g) on the x-axis.

The electrochemical characteristics of this material were determined using the procedure of Example 6 and the resultant second cycle of the discharge curve is shown in FIG. 8. Specifically, this curve shows a capacity of 122 mAh/g.

EXAMPLE 9

A tin-containing gel was first prepared by dissolving 6.23 g of $SnCl_4$ and 2.6 g lithium hydroxide in 150 ml distilled water at 20° C. To this solution was added 3.75 g CTAB and 6.78 g tetraethylorthosilicate. The following relative amounts (molar ratios) of the reactant were used:

1 $SnO_2$:1 $SiO_2$:1 $Lio_2$:1 CTAB:240 $H_2O$

The gel was agitated at room temperature for about 2 hours and then placed in a Parr pressure reactor and stirred at 135° C. for about 24 hours. The product was filtered, washed with distilled water and dried under vacuum. The surfactant was removed by calcining the product at 520° C. for about 10 hours.

Figure 9:
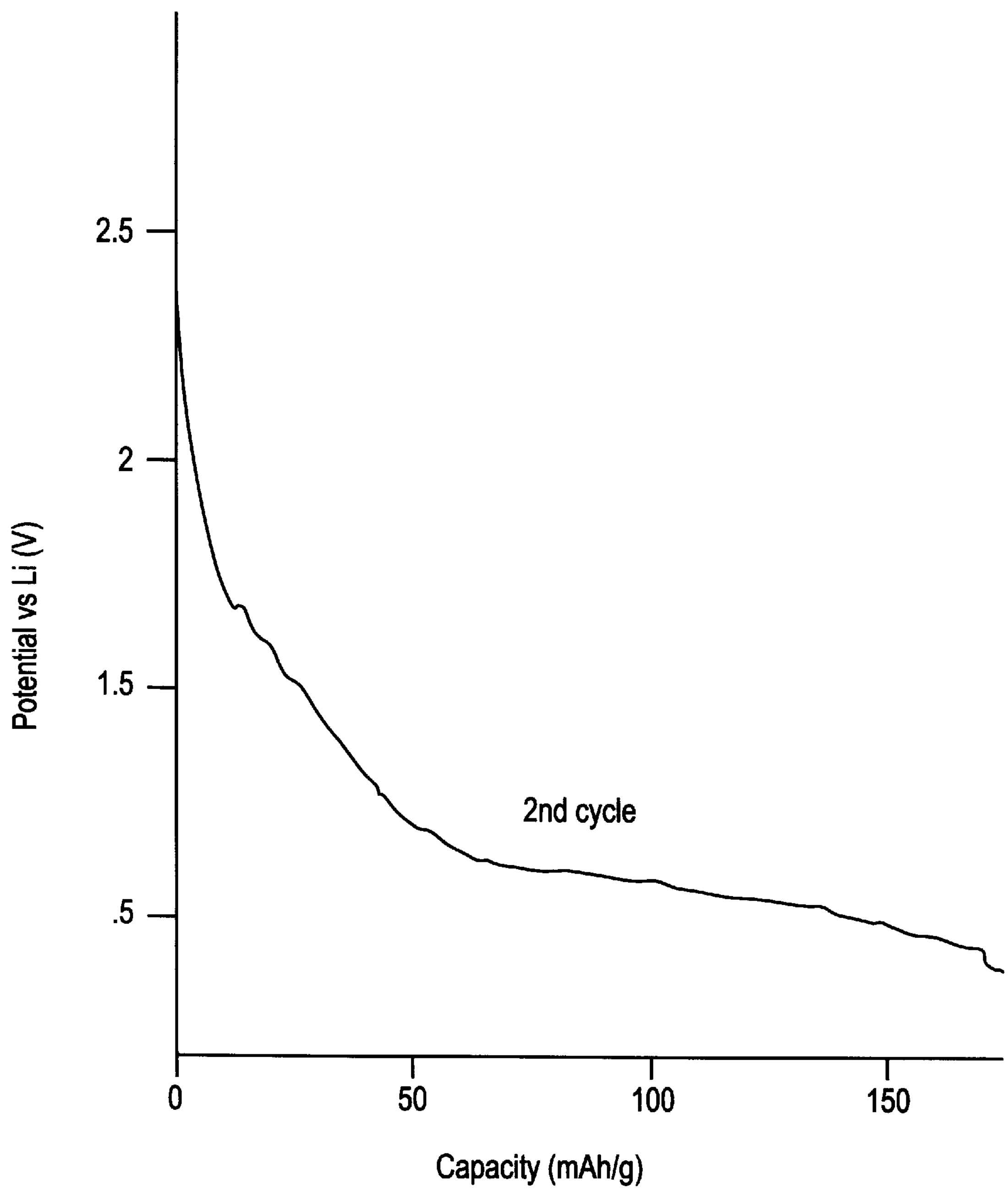
FIG. 9 is the second cycle of the discharge curve of the sample prepared in Example 9; plotted in terms of Potential vs. Li (V) on the y-axis and capacity (mAh/g) on the x-axis.

The electrochemical characteristics of this material were determined using the procedure of Example 6 and the resultant second cycle of the discharge curve is shown in FIG. 9. Specifically, this curve shows a capacity of 172 mAh/g.

EXAMPLE 10

A tin-containing gel was first prepared by dissolving 6.23 g of $SnCl_4$ and 2.6 g lithium hydroxide in 150 ml distilled water at 20° C. To this solution was added 3.75 g CTAB and 4.92 g tetraethylorthosilicate. The following relative amounts (molar ratios) of the reactant were used:

1 $SnO_2$:1 $SiO_2$:1 $LiO_2$:0.30 CTAB:240 $H_2O$

The gel was agitated at room temperature for about 2 hours and then placed in a Parr pressure reactor and stirred at 135° C. for about 24 hours. The product was filtered, washed with distilled water and dried under vacuum. The surfactant was removed by calcining the product at 520° C. for about 10 hours.

Figure 10:
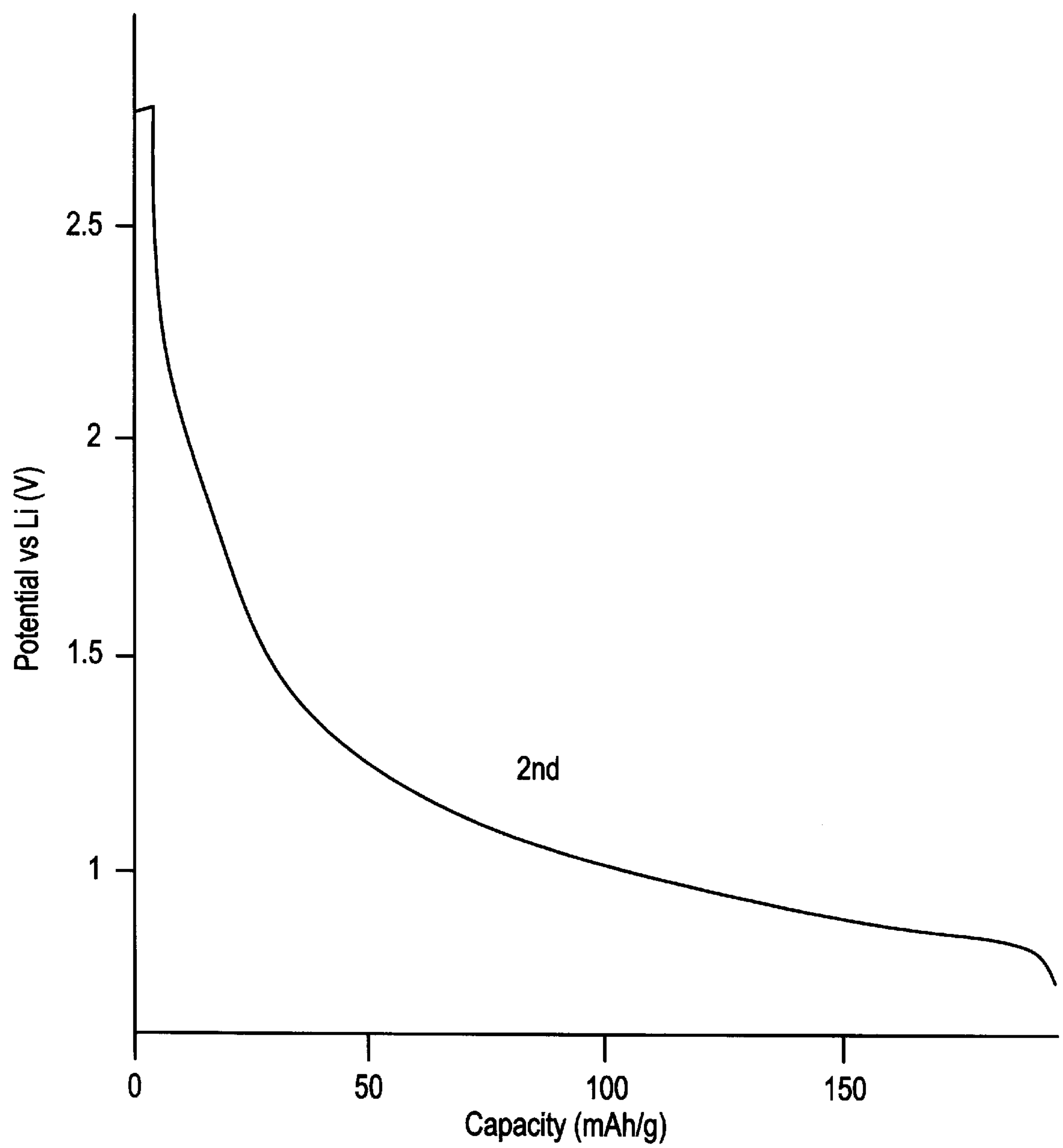
FIG. 10 is the second cycle of the discharge curve of the sample prepared in Example 10; plotted in terms of Potential vs. Li (V) on the y-axis and capacity (mAh/g) on the x-axis.

The electrochemical characteristics of this material were determined using the procedure of Example 6 and the resultant second cycle of the discharge curve is shown in FIG. 10. Specifically, this curve shows a capacity of 195 mAh/g.

EXAMPLE 11

A tin-substituted mesostructural material was prepared by dissolving 9.56 g of CTAB and 5.0 g of tin(II) acetate in 110 ml of distilled water. To this solution was added 1.76 g of lithium hydroxide monohydrate and 8.86 g of TEOS. The resultant mixture was then treated at 70° C. for 6 hours until gel formation. The gel was then hydrothermally treated at 150° C. for 72 hours. The product was filtered, washed with distilled water, dried at 110° C. for 12 hours and then calcined at 500° C. for six hours. This procedure resultant in a mesostructural material that contained about 25% tin.

Figure 11:
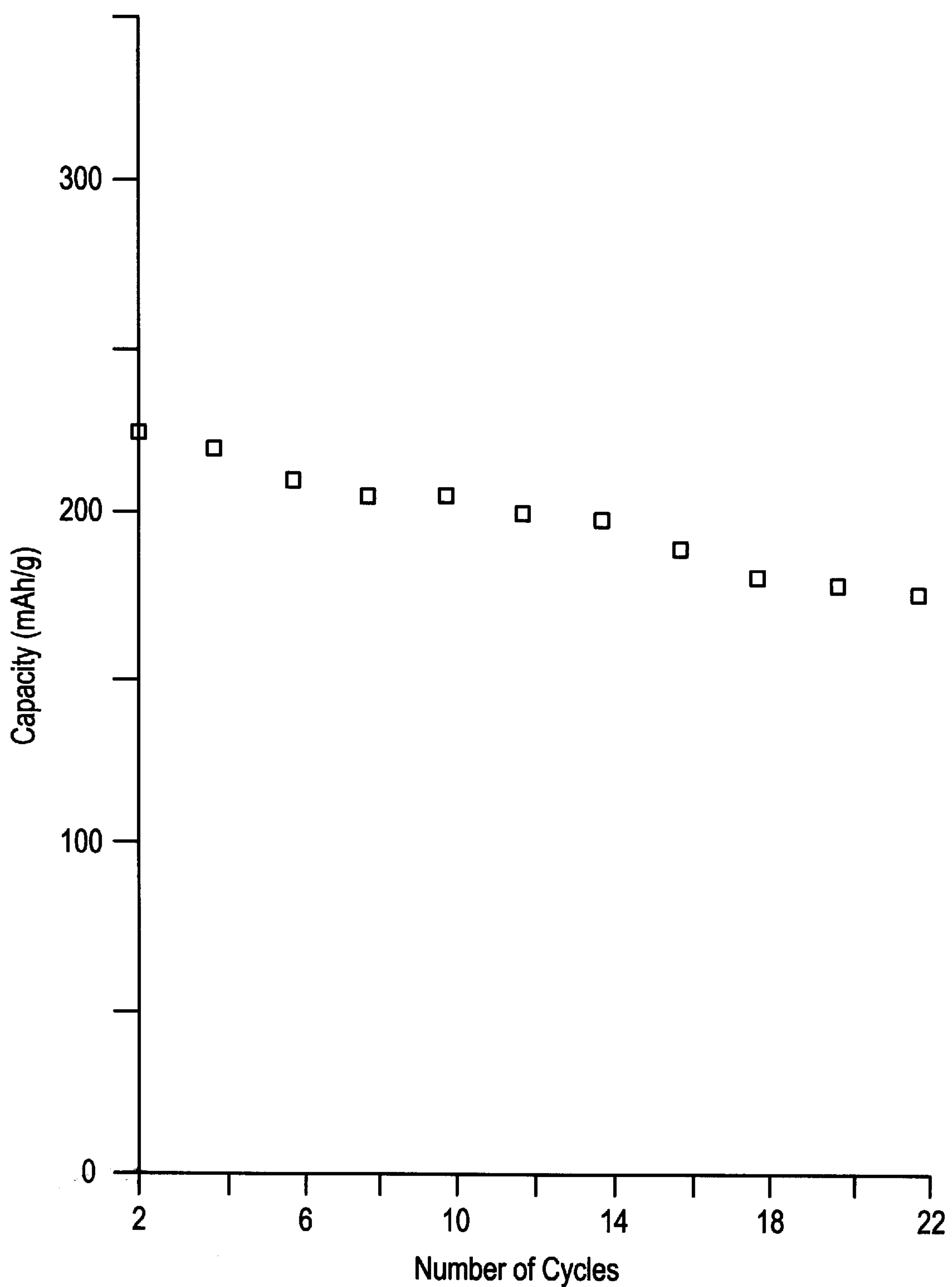
FIG. 11 is the cycling performance of a two-electrode Li battery cell with a tin mesostructure material as the cathode as prepared in Example 11; plotted in terms of capacity (mAh/g) vs. number of cycles.

The electrochemical characteristics of this material were determined using the procedure of Example 6 and the cycling performance of the two-electrode Li battery cell containing tin mesostructural material as the cathode, metallic Li as the anode and $LiPF_6$/PC-DMC as the electrolyte is shown in FIG. 11. Specifically, this curve shows a current density of 0.12 $mA/cm^2$.

TEM measurements of the tin-substituted mesostructural material were obtained using the procedure described in Example 1. The TEM image showed that the tin-substituted mesostructural tin cathode material had a pore structure in lamellar morphology with a pore size of about 3.6 nm.

While the invention has been particularly shown and described with respect to preferred embodiments thereof, it will be understood by those skilled in the art that the foregoing and other changes in form and details may be made therein without departing from the spirit and scope of the present invention.

Having thus described our invention, what we claim as new, and desire to secure by the Letters Patent is:

1. An electrode useful in Li ion rechargeable batteries comprising:

(a) a host material, wherein said host material is a mesostructural metal oxide having the formula $$Li_nQ_xM_yO_z$$

wherein n is from about 0.1 to about 1.1; x is from about 0.5 to about 1.0; y is 0.05 to about 0.5; z is about 2; Q is Si, Al, P or mixtures thereof; and M is a transition or a non-transition metal selected from Group VB, VIIB, VIII and IVA of the Periodic Table of Elements;

(b) an inert organic binder; and (c) a conducting agent.

2. The electrode of claim 1 wherein said mesostructural metal oxide comprises a three-dimensional framework structure containing inorganic walls and channels having a pore size of from about 2 to about 20 nanometers.

3. The electrode of claim 2 wherein said framework structure is a lamellar, hexagonal or cubic structure.

4. The electrode of claim 1 wherein said mesostructural metal oxide has a pore size of from about 2 to about 10 nanometers.

5. The electrode of claim 1 wherein said mesostructural metal oxide has a surface area of from about 650 to about 1400 $m^2/g$ and a pore volume of from about 0.1 to about 0.6 cc/g.

6. The electrode of claim 5 wherein said mesostructural metal oxide has a surface area of from about 750 to about 1250 $m^2/g$ and a pore volume of from about 0.2 to about 0.5 cc/g.

7. The electrode of claim 1 wherein Q is Si.

8. The electrode of claim 1 wherein M is vanadium (V), manganese (Mn), iron (Fe), cobalt (Co) or tin(Sn).

9. The electrode of claim 1 wherein component (a) is present in an amount of from about 75 to about 90 weight percent; component (b) is present in an amount of from about 5 to about 15 weight percent; and component (c) is present in an amount of from about 5 to about 10 weight percent.

10. The electrode of claim 9 wherein component (a) is present in an amount of from about 80 to about 85 weight percent; component (b) is present in an amount of from about 10 to about 12 weight percent; and component (c) is present in an amount of from about 5 to about 8 weight percent.

11. An cathode useful in Li ion rechargeable batteries comprising:

(a) a cathode host material, wherein said cathode host material is a mesostructural metal oxide having the formula $$Li_nQ_xM_yO_z$$

wherein n is from about 0.1 to about 1.1; x is from about 0.5 to about 1.0; y is 0.05 to about 0.5; z is about 2; Q is Si, Al, P or mixtures thereof; and M is a transition or a non-transition metal selected from Group VB, VIIB, and VIII of the Periodic Table of Elements;

(b) an inert organic binder; and (c) a conducting agent.

12. The cathode of claim 11 wherein said mesostructural metal oxide comprises a three-dimensional framework structure containing inorganic walls and channels having a pore size of from about 2 to about 20 nanometers.

13. The cathode of claim 12 wherein said three-dimensional framework structure is a lamellar, hexagonal or cubic structure.

14. The cathode of claim 11 wherein said mesostructural metal oxide has a pore size of from about 2 to about 10 nanometers.

15. The cathode of claim 11 wherein said mesostructural metal oxide has a surface area of from about 650 to about 1400 $m^2/g$ and a pore volume of from about 0.1 to about 0.6 cc/g.

16. The cathode of claim 15 wherein said mesostructural metal oxide has a surface area of from about 750 to about 1250 $m^2/g$ and a pore volume of from about 0.2 to about 0.5 cc/g.

17. The cathode of claim 11 wherein Q is Si.

18. The cathode of claim 11 wherein M is vanadium (V), cobalt (Co) or manganese (Mn).

19. The cathode of claim 11 wherein component (a) is present in an amount of from about 75 to about 90 weight percent; component (b) is present in an amount of from about 5 to about 15 weight percent; and component (c) is present in an amount of from about 5 to about 10 weight percent.

20. The cathode of claim 19 wherein component (a) is present in an amount of from about 80 to about 85 weight percent; component (b) is present in an amount of from about 10 to about 12 weight percent; and component (c) is present in an amount of from about 5 to about 8 weight percent.

21. An anode useful in Li ion rechargeable batteries comprising:

(a) an anode host material, wherein said anode host material is a mesostructural metal oxide having the formula $$Li_nQ_xM_yO_z$$

wherein n is from about 0.1 to about 1.1; x is from about 0.5 to about 1.0; y is 0.05 to about 0.5; z is about 2; Q is Si, Al, P or mixtures thereof; and M is a non-transition metal selected from Group IVA of the Periodic Table of Elements or iron;

(b) an inert organic binder; and (c) a conducting agent.

22. The anode of claim 21 wherein said mesostructural metal oxide comprises a three-dimensional framework structure containing inorganic walls and channels having a pore size of from about 2 to about 20 nanometers.

23. The anode of claim 22 wherein said three-dimensional framework structure is a lamellar, hexagonal or cubic structure.

24. The anode of claim 21 wherein mesostructural metal oxide has a pore size of from about 2 to about 10 nanometers.

25. The anode of claim 21 wherein said mesostructural metal oxide has a surface area of from about 650 to about 1400 $m^2/g$ and a pore volume of from about 0.1 to about 0.6 cc/g.

26. The anode of claim 25 wherein said mesostructural metal oxide has a surface area of from about 750 to about 1250 $m^2/g$ and a pore volume of from about 0.2 to about 0.5 cc/g.

27. The anode of claim 21 wherein Q is Si.

28. The anode of claim 21 wherein M is tin(Sn) or iron (Fe).

29. The anode of claim 21 wherein component (a) is present in an amount of from about 75 to about 90 weight percent; component (b) is present in an amount of from about 5 to about 15 weight percent; and component (c) is present in an amount of from about 5 to about 10 weight percent.

30. The anode of claim 29 wherein component (a) is present in an amount of from about 80 to about 85 weight percent; component (b) is present in an amount of from about 10 to about 12 weight percent; and component (c) is present in an amount of from about 5 to about 8 weight percent.

31. A Li rechargeable battery system comprising (a) an anode; (b) a cathode; and (c) an electrolyte having Li ion conductivity, wherein at least one of said anode or cathode is comprised of a mesostructural metal oxide having the formula $$Li_nQ_xM_yO_z$$

wherein n is from about 0.1 to about 1.1; x is from about 0.5 to about 1.0; y is 0.05 to about 0.5; z is about 2; Q is Si, Al, P or mixtures thereof; and M is a transition or a non-transition metal selected from Group VB, VIIB, VIII and IVA of the Periodic Table of Elements.

32. The battery system of claim 31 wherein said mesostructural metal oxide comprises a three-dimensional framework structure containing inorganic walls and channels having a pore size of from about 2 to about 20 nanometers.

33. The battery system of claim 32 wherein said three-dimensional framework structure is a lamellar, hexagonal or cubic structure.

34. The battery system of claim 31 wherein said mesostructural metal oxide has a pore size of from about 2 to about 10 nanometers.

35. The battery system of claim 31 wherein said mesostructural metal oxide has a surface area of from about 650 to about 1400 $m^2/g$ and a pore volume of from about 0.1 to about 0.6 cc/g.

36. The battery system of claim 35 wherein said mesostructural metal oxide has a surface area of from about 750 to about 1250 $m^2/g$ and a pore volume of from about 0.2 to about 0.5 cc/g.

37. The battery system of claim 31 wherein Q is Si.

38. The battery system of claim 31 wherein said anode is composed of Li metal or a carbonaceous material and said cathode comprises a mesostructural metal oxide having the formula $$Li_nQ_xM_yO_z$$

wherein n is from about 0.1 to about 1.1; x is from about 0.5 to about 1.0; y is 0.05 to about 0.5; z is about 2; Q is Si, Al, P or mixtures thereof; and M is a transition or a non-transition metal selected from Group VB, VIIB, and VIII of the Periodic Table of Elements.

39. The battery system of claim 38 wherein M is vanadium (V), cobalt (Co) or manganese (Mn).

40. The battery system of claim 38 wherein Q is Si.

41. The battery system of claim 31 wherein said cathode is composed of $Li_xCoO_2$ and said anode comprises a mesostructural metal oxide having the formula $Li_nQ_xM_yO_z$ wherein n is from about 0.1 to about 1.1; x is from about 0.5 to about 1.0; y is 0.05 to about 0.5; z is about 2; Q is Si, Al, P or mixtures thereof; and M is a non-transition metal selected from Group IVA of the Periodic Table of Elements or iron.

42. The battery system of claim 41 wherein M is Sn or Fe.

43. The battery system of claim 41 wherein Q is Si.

44. The battery system of claim 31 wherein said anode and said cathode are both mesostructural metal oxides.

* * * * *